US006328913B1

United States Patent
Shaffer et al.

(10) Patent No.: US 6,328,913 B1
(45) Date of Patent: Dec. 11, 2001

(54) COMPOSITE MONOLITHIC ELEMENTS AND METHODS FOR MAKING SUCH ELEMENTS

(76) Inventors: Peter T. B. Shaffer, 3225 Chimney Cove Dr., Cumming, GA (US) 30041; Marvin C. Lunde, 1950 Golden Ridge Cir., Cumming, GA (US) 30040

( * ) Notice: Subject to any disclaimer, the term of this patent is extended or adjusted under 35 U.S.C. 154(b) by 0 days.

(21) Appl. No.: 09/386,470

(22) Filed: Aug. 31, 1999

Related U.S. Application Data

(60) Provisional application No. 60/098,886, filed on Sep. 2, 1998.
(51) Int. Cl.[7] .................................................. H01B 1/00
(52) U.S. Cl. ........................ 252/500; 252/504; 252/516; 252/518.1; 501/92; 501/96; 501/97; 501/88; 501/89
(58) Field of Search .................................. 252/500, 504, 252/516, 518.1; 501/92, 88, 96, 89, 97

(56) References Cited

U.S. PATENT DOCUMENTS

| | | |
|---|---|---|
| 3,372,305 | 3/1968 | Mikulec . |
| 3,890,250 | 6/1975 | Richerson . |
| 4,590,034 | 5/1986 | Hirano et al. . |
| 4,804,823 | 2/1989 | Okuda et al. . |
| 5,085,804 | 2/1992 | Washburn . |
| 5,233,166 | 8/1993 | Maeda et al. . |

Primary Examiner—Yogendra N. Gupta

(57) ABSTRACT

A composite monolithic element for use as a hot surface ignitor or the like includes first and second regions or layers. The first region or layer comprises a low pressure ejection molded mixture of silicon carbide and silicon nitride particles or other compatible mix which will alter processing art as a resistor. This resistor includes two cold portions and a hot portion intermediate thereof. The second region or layer also includes an ejection molded mixture of silicon carbide and silicon nitride particles or other appropriate mixture, while the second layer contains the same or similar compounds as the first, the rations of the compound differ so that after processing it acts as an insulator and as a support for the first layer. These first and second layers are bonded together to form a joint free mechanically continuous structure and densified.

11 Claims, 2 Drawing Sheets

COMPOSITE MONOLITHIC ELEMENTS AND METHODS FOR MAKING SUCH ELEMENTS

This application is based on and claims the priority of our U.S. Provisional Application, Ser. No. 60/098,886 which was filed on Sep. 2, 1998.

FIELD OF THE INVENTION

This invention relates to composite monolithic elements and more particularly to composite monolithic ceramic elements for use as or in electrical devices. The invention also relates to methods for making such elements.

BACKGROUND FOR THE INVENTION

The use of ceramic or refractory compositions for electrical devices such as insulators and resistors has been well known for many years. For example, igniters for fluid fuel burning systems have been described in the Mikulec U.S. Pat. No. 3,372,305. Such igniters, which may be referred to as spiral igniters are composed of a non-metallic resistance material such as a very dense, recrystallized silicon carbide.

In the Mikulec spiral igniters, a pair of diametrically opposed slots are cut through the radial wall thickness of an elongated, hollow, tubular resistance body to form two semi-circular laterally spaced legs. A pair of closely spaced spiral slots are then cut through the wall of the body to form a pair of helical bands and an end connecting portion to provide a continuous electrical path. This type of igniter has had wide spread commercial success, but is relatively fragile and includes a number of manufacturing steps. In addition, the yield in the manufacturing process is often less than desired.

High strength refractory resistor compositions are disclosed in the U.S. Pat. No. 3,890,250 of Richerson. As disclosed therein, a resistor is composed of from 50–90% by weight of silicon nitride and 10 to 50% by weight of silicon carbide. The electrical resistivity varies from a maximum of $1 \times 10^7$ ohm cm to about 0.002 ohm cm. The high strength characteristics are the result of hot-pressing the mixture of powders which brings about almost complete densification. However, when this material is used as an igniter, the hot zone degrades rather quickly e.g. goes from a resistance of about 180 to about 250 ohms and the cold ends from about 40 ohms to about 150 ohms.

A further approach to igniters is disclosed in the U.S. Pat. No. 4,205,363 of Maeda et. al. The igniter disclosed therein comprises about 95% silicon carbide and up to 5% of a negative doping agent such as nitrogen, phosphorous, arsenic, antimony and bismuth. However in order to obtain rapid heat up time as required for igniting a gas, the igniter must be made with a small cross section. Therefore, the igniters are very fragile.

A more recent igniter development is disclosed in Washburn, the U.S. Pat. No. 5,085,804. As disclosed therein, an electrical device is made up of a sintered, preferably a hot-pressed mixture of fine powders of aluminum nitride or silicon nitride, silicon carbide and molybdenum disilicide with all three present in substantial quantities. The total structure of the disclosed refractory body is essentially that of two separate, but intertwined structures with one structure being contained within the other structure. An essential feature of this type of total structure is that even though there is intimate contact between the two intertwined structures there is no or very little chemical reaction between or diffusion of atoms from one structure to the other.

Ceramic and refractory compositions have also been used in the manufacture of ceramic heaters which incorporate a ceramic substrate and a heat generating resistor disposed in the interior or on the surface of the substrate. As disclosed in the U.S. Pat. No. 4,804,823 of Okuda et al., a ceramic heater comprises a sintered silicon nitride body as a substrate, a resistance heater on the surface of the substrate and terminals connected to both ends of the heat-generating resistor. The heat-generating resistor is composed of a ceramic layer containing titanium nitride (TiN) or tungsten carbide (WC).

It is now believed that there may be a significant commercial demand for a composite monolithic element in accordance with the present invention. It is also believed that the elements in accordance with the present invention are particularly applicable as solid state igniters for fluid fuels, and are also suitable for many other applications such as heating elements, integrated circuits and other electrical devices which incorporate resistors and insulators. The demand for such elements is further enhanced by the advantages which are inherent in the composite monolithic elements.

The composite monolithic elements in accordance with the present invention have a seamless bond which is formed by short range diffusion of fine particles. Therefore, there is no strength limiting seam and the elements are less fragile than more conventional macro composite layered structures. This is an important consideration in the manufacture and use of hot surface igniters. Furthermore, the igniters in accordance with the present invention incorporate a relatively robust substrate which fully supports the more fragile resistor and protects the resistor from breakage during handling and further manufacturing steps such as the testing, installation of a shield, installation in an appliance and use.

In addition, composite monolithic elements containing saturation doping in accordance with the present invention can be manufactured with consistent, reproducible electrical resistivity and constant dopant concentrations. Such elements or igniters have also been found to have consistent strength, thermal expansion and thermal shock effects, and resistance to in-use degradation through oxidation and dopant diffusion.

Furthermore, the manufacturing process in accordance with the present invention is effective in providing green bodies with relatively high particle concentrations and very high density, fine grain bodies under less severe conditions than normally encountered with similar products. This use of high green density results in relatively little shrinkage and deformation during the removal of organic binders, minimal shrinkage and deformation during sintering, and essentially no shrinkage during reaction bonding. The process is also effective in obtaining relatively high yields of products with consistent chemical, mechanical and electrical properties.

BRIEF SUMMARY OF THE INVENTION

In essence, the present invention contemplates a composite monolithic element which includes a first region such as a zone or layer having a first specific property. The element also includes a second region, zone or layer having a second specific property. The first and second regions are bonded together to form a joint free mechanically continuous structure.

In one embodiment of the invention, the composite monolithic element includes two polyphasic ceramic regions wherein the two regions contain common phases. In this embodiment, one of the regions acts as an insulator and the other as a resistor.

The present invention also contemplates a method for making a composite monolithic element. The method includes the step of providing a first mass of inorganic particles, preferably ceramic particles and a thermoplastic binder, mixing the inorganic particles and thermoplastic binder to form a stable dispersion with a high concentration of solids, preferably in the range of 60 to 85% by volume solids and preferably as high as possible for ejection molding. A green body preform is then formed from the stable dispersion. The method also includes a step of providing a second mass of inorganic, preferably ceramic particles and a thermoplastic binder, and mixing the inorganic particles and thermoplastic binder to form a second stable dispersion with a high concentration of solids, preferably in the range of 60 to 85% by volume solids. A second green body preform is then formed from the second stable dispersion.

At least a portion of the first and second preforms are brought into and maintained in intimate contact with one another and the bodies heated to remove a major portion and preferably essentially all of the organic binders to thereby form a brown body. The brown body is then heated to a temperature of at least 1000° C. (sintered) to thereby form a seamless composite monolithic element.

The invention will now be described in connection with the accompanying drawings wherein like references numerals have been used to indicate like elements.

DESCRIPTION OF THE PREFERRED EMBODIMENTS OF THE INVENTION

The composite monolithic elements in accordance with the present invention are particularly suitable for use as or in electrical or electronic devices. The elements are also suitable for use as solid state or hot surface igniters for gas stoves, water heaters and the like. While it is believed that the composite monolithic elements may be used in a number of other applications which incorporate insulators and resistors, they will be described hereinafter in connection with heating elements and/or igniters.

Figure 1:
FIG. 1 is a side elevational view of a prior art silicon carbide igniter.
Figure 2:
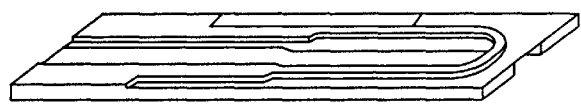
FIG. 2 is a perspective view of a U-shaped heat generating resistor layer on a substrate as disclosed in the prior art.

Over the years, silicon carbide has been considered to be a near-ideal material for the production of hot surface igniters. These materials offer a reasonable range of electrical resistance depending on the semiconductor dopants and their concentrations. Such materials are also resistant to high temperature degradation through oxidation and impurity diffusion. One example of a typical prior art silicon carbide igniter is shown in FIG. 1.

However, silicon carbide, like other ceramic materials has limited strength and low resistance to impact (brittleness). It also requires extreme temperatures, typically in excess of 2000° C. for its manufacture and as a consequence, control of or elimination of dopant impurities is quite difficult. In order to obtain useful ranges of resistivity for monolithic SiC igniters, it is usually necessary to maintain a relatively low concentration of dopants and associated carriers. Under such conditions, the concentrations are controlled within ranges where small differences in dopant concentration result in significant changes in electrical conductivity. Consequently, the behavior of the resulting devices is significantly changed. Therefore, the desired electrical characteristics are obtained by a final sorting process which results in a less than desirable yield.

Even under low conductivity conditions, the length to cross section ratios of silicon carbide igniters are relatively large in order to obtain the necessary resistance to balance the desired ranges of voltage. This high aspect ratio further decreases the strength and increases the fragility of the devices.

In the manufacture of commercially viable heating elements and igniters, it is important to consider a number of factors. For example, it is important to produce devices which have consistent, reproducible electrical resistivity, a constant and positive temperature coefficient of resistivity at least over a wide range of high temperatures, constant dopant concentration and strength. It is also important to produce devices with consistent thermal expansion and thermal shock effects and resistance to in-use degradation through oxidation and dopant diffusion.

Figure 3:
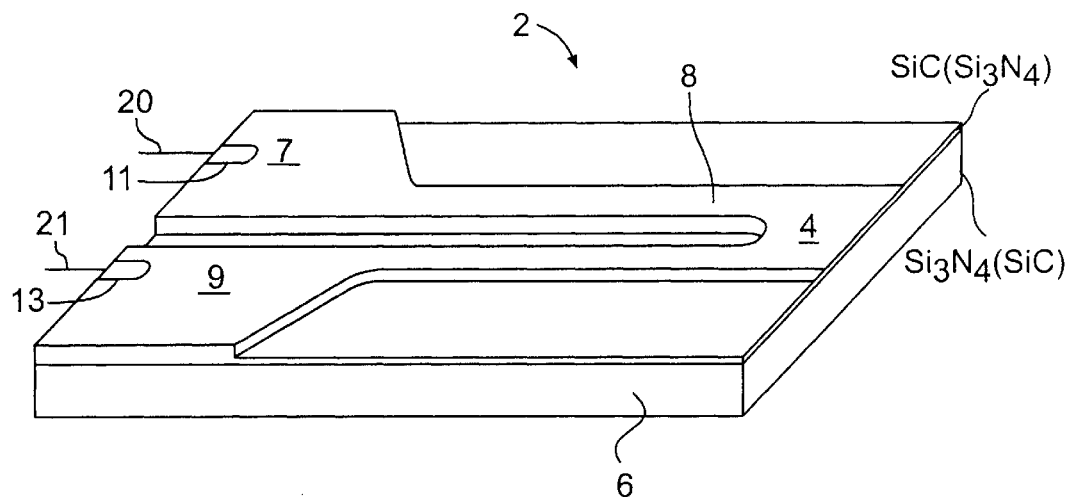
FIG. 3 is a perspective view of a hot surface igniter in accordance with a first embodiment of the present invention.
Figure 4:
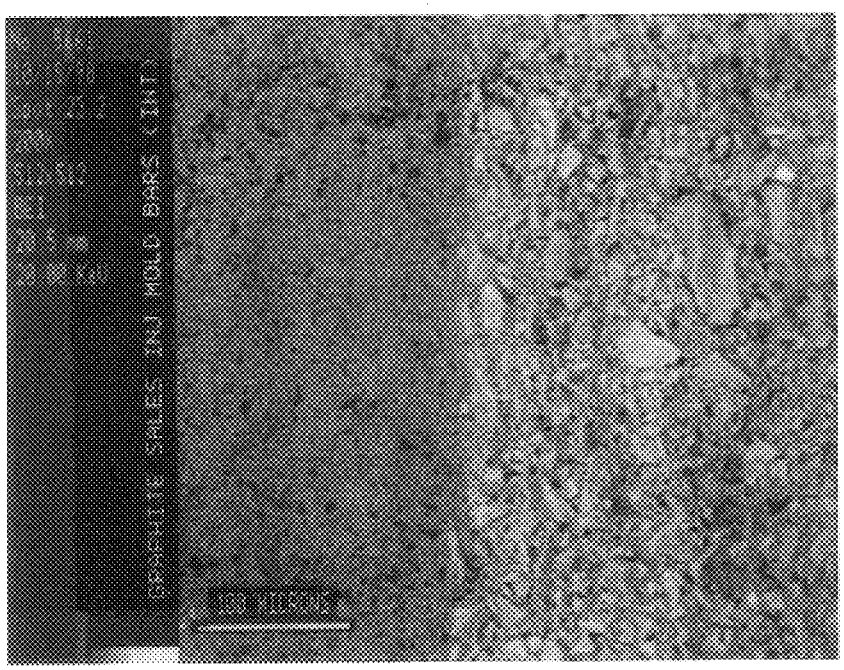
FIG. 4 is a photomicrograph of a polished section of the igniter shown in FIG. 3; and, FIG. 5 is a photomicrograph of a polished section of the igniter but shows migration across the interface.
Figure 5:
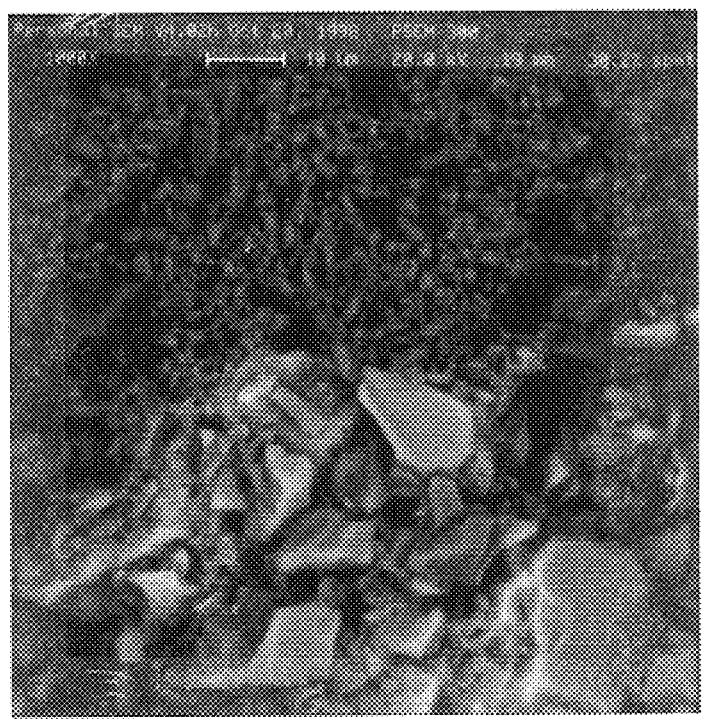

A composite monolithic heating element or igniter 2 in accordance with a first embodiment of the invention is shown in FIG. 3. As illustrated, the igniter 2 includes a first region or layer 4 which has a first specific property. For example, in this embodiment of the invention, the first region or layer 4 act as a conductor or hot portion of the igniter 2. The igniter 2 also includes a second region or layer 6 which has a second specific property which is different than the specific property of the first layer 4. For example, the second layer 6 may act as an insulator and at the same time provides a physical support for the conductive layer 4.

An important feature of the present invention resides in the bonding together of the first and second layers 4 and 6 with a joint free bond to thereby form a mechanically continuous structure. This formation of a joint free mechanically continuous structure allows for the use of an extremely thin conductive layer 4. This feature i.e. the relatively thin conductive layer may be particularly important for the construction of a 220 volt igniter.

In this embodiment of the invention, each of the layers 4 and 6 are polyphasic and contain common phases. For example, the first or conductive layer 4 may be made of a mixture of about 60 to about 70% by volume silicon carbide and about 30 to about 40% by volume silicon nitride. The second or insulating layer 6 may then be made from a mixture of about 30 to about 40% by volume silicon carbide and about 60 to about 70% by volume of silicon nitride.

In igniters and/or heaters in accordance with the invention, it is important to match or nearly match the thermal expansion coefficients of the two layers. Failure to do so would result in damages to the igniters due to differences in expansion over the normal range of the igniter temperature. For example, it is important that the igniters can be repeatedly cycled for up to 10,000 or more cycles between ambient temperature and 1200° C. and higher.

For this reason, it is advantageous to incorporate silicon carbide and silicon nitride in each layer because silicon carbide and silicon nitride each have relatively low coefficients of thermal expansion. Furthermore, the igniters are less susceptible to damage from thermal shock due to rapidly changing temperature conditions. For example, the coefficient of thermal expansion of silicon carbide is about 4.5 ppm per degree Centigrade ($4.5 \times 10^{-6}$ cm./cm° C.), while that of silicon nitride is approximately 3.0 ppm. As a result of this rather significant difference in the coefficients of thermal expansion, thermal stresses would be expected between the two layers during thermal cycling of an igniter as for example between room temperature and about 1200° C.

In order to reduce this difference between the two layers 4 and 6, materials are added to each layer in order to reduce the coefficient of thermal expansion of the silicon carbide layer and to increase the coefficient of thermal expansion of the silicon nitride layer. For example, a quantity of silicon nitride is added to the silicon carbide layer, little enough that the continuity and conductance of the silicon carbide phase is not interrupted. Approximately 30 to 40% by volume silicon nitride can normally be added without problems assuming relatively small particle size with relatively equi-axed particles. The amount of second phase that can be added depends on the size and shape of the particles of the dispersed phase. It should be recognized that there is some variation of particle sizes and at least a relatively small percentage of very fine particles, together with the courser particles. To be more specific, the particle size may vary between about and less than 0.1 microns and 10 microns.

A quantity of silicon carbide is also added to the silicon nitride layer to increase its coefficient of thermal expansion. In this case, the amount of silicon carbide is limited to prevent the composite from forming a continuous silicon carbide phase in the silicon nitride body and becoming electrically conductive. It is presently believed that about 30 to 40 volume percent should be added based on relatively small particle sizes.

The net effect of the aforementioned additions is that the coefficient of thermal expansion of the conductive layer 4 is reduced by 30 to 40% of the difference between the two pure materials i.e., to about 3.9 to 4.05. At the same time, the coefficient of thermal expansion of the insulator layer 6 is increased by 30 to 40% of the difference, to 3.45 to 3.6 ppm. The result is that the coefficient of thermal expansion of the two layers is reduced from 1.5 ppm per degree C to only 0.3 to 0.6 ppm.

A further advantage of adding silicon nitride to the conductive layer 4 is that the silicon nitride acts as a diluent and increases the electrical resistivity by about 30 to 40% to more than 0.002 ohm cm and preferably to about 0.003 ohm cm.

It is also important that the materials used in high temperature igniters are compatible and chemically stable. For this reason, silicon carbide and silicon nitride are considered to be ideal. Both offer excellent high temperature characteristics for those applications which involve oxidizing atmospheres. Both materials are resistant to severe oxidation to nearly 1500° C. In addition, silicon carbide and silicon nitride are compatible in contact with one another up to the temperature at which the silicon nitride itself begins to dissociate.

In a preferred embodiment of the invention, the conductive layer 4 is prepared in a nitrogen atmosphere and the silicon carbide is doped to its saturation point. By so doing, the electrical behavior of the electrically conductive carbide will be constant. This saturation doping eliminates the conductivity variation encountered when only partial doping or partial doping of a counterdoping species is introduced.

In those cases in which a regular temperature coefficient (negative) is desired, an amount of a counter dopant such as aluminum may be incorporated in the silicon carbide to achieve that effect. Nonetheless, the silicon carbide is still saturation doped with nitrogen in order to achieve consistent electrical resistivity.

In the prior art, referring to monolithic silicon carbide igniters, it has been conventional practice to maintain relatively low concentrations of dopants and their associated carriers. Under these conditions, the concentrations are controlled within ranges where small changes in concentration result in relatively large changes in electrical conductivity. Consequently, the behavior of the resulting devices are affected. As a result, consistent electrical characteristics are obtained by a final sorting process in which each device is tested and categorized.

Now, as the concentration of the doping atoms approaches a limiting solubility concentration, the effect of small changes in concentration have a relatively small effect on the resistivity. Therefore, with a constant electrical resistivity of the layer 4 in the igniter 2, complete control of the electrical behavior of the igniter 2 can be accomplished by controlling the geometry of the layer 4 i.e. the thickness, length, width and aspect ratio. For example, the layer 4 maybe relatively thin with an aspect ration in excess of 100:1. The aspect ratio is equal to the length divided by the cross section. For this reason, a sorting and categorizing step can be eliminated in manufacturing the igniters in accordance with the present invention.

It should be recognized that under normal conditions where dopants and counterdopants are present, the resistivity of silicon carbide decreases with increasing temperature which would normally lead to an uncontrollable igniter. However, above about 1100° C. to 1200° C. the coefficient of resistivity reverses and becomes positive. This allows a practical silicon carbide igniter which will not exhibit so called "run away characteristics".

Silicon carbide which is saturation doped with nitrogen produces an electrical conductivity of about 0.002 ohm cm. Under normal conditions, this value is too low to permit the manufacture of a monolithic device having a practically achievable aspect ratio which will produce the desired resistance yet exhibit sufficient strength to be useful. However, under these dopant concentrations, a silicon carbide device exhibits relatively constant resistivity increasing slightly as temperatures are carried from ambient to 1000° C. Above about 1000° C., the temperature, the variation of resistivity with changes in temperature becomes slightly positive. For example, the resistivity of a saturation doped silicon carbide varies from about 0.0015 ohm cm at 0° C. to about 0.0033 ohm cm at about 1000° C. By comparison, the resistance temperature coefficient of the conductive layer 4 is between about $1 \times 10^{-6}$ to $1 \times 10^{-6}$ ohm cm/° C.

In a preferred embodiment of the invention, each of the layers 4 and 6 are polyphasic, contain common compounds i.e. each contains silicon carbide and silicon nitride, and are made of different physical compositions. In other words, each of the layers has a different chemical composition so that the composition across the element is non-uniform. For example, the conductive layer 4 may contain 60 to 70% by volume (58 to 67% by weight) silicon carbide and 30 to 40% by volume (33 to 42% by weight) silicon nitride while the insulating layer contains from 60 to 70% by volume (61 to 71% by weight) silicon nitride and 30 to 40% by volume (29 to 39% by weight) silicon carbide.

As shown in FIG. 3, the layer 4 includes a hot portion 8 and two cold end portions 7 and 9 which have a considerably smaller aspect ratio than the hot portion 8. Electrical contacts 11 and 13 are then formed on the cold portion 7 and 9 and adapted to be connected to a source of electrical power, so that electric current passing through the heating element (layer 4) elevates the temperature thereof. The layer 4 may, for example, have a generally U-shape with the hot portion 8 between the two cold end portions 7 and 9. These contacts 11 and 13 may be formed by any conventional manner, as for example, by the techniques disclosed by Washburn in the U.S. Pat. No. 5,085,804 which is incorporated herein in its entirety by reference. Electrical wires 20 and 21 or leads are attached in a conventional manner for the connection to the electrical sources.

The following examples are illustrations of the compositions for ignitors in accordance with the preferred embodiments of the invention

EXAMPLE 1

| 80 v/o SiC-20 v/o $Si_3N_4$ (Low pressure Ejection Molding) | |
|---|---|
| Silicon Carbide (Green) | |
| FF Size | 592.8 grams |
| 1200 Grit | 441.0 |
| 1600 Grit | 114.0 |
| LS-13 | 49.2 |
| UF-10 | 84.7 |
| UF-15 | 231.0 |
| UF-25 | 16.7 |
| UF-45 | 15.8 |
| Total SiC | 1545 Grams |
| $Si_3N_4$ - 325 | 295 grams |
| Organics | |
| Paraffin Waxes | 217.5 Grams |
| Montan Wax | 3.3 Grams |
| Surfactants/Modifier | |
| Ethylene vinyl acetate | 4.4 |
| Exxon Vistanex | 5.1 |
| Steric Acid Diethanolamicle | 2.6 |
| Oleic Acid | 7.8 |
| Chevron Oloa 1200 | 9.4 |
| Polyueric Fatty Ester | 2.2 |
| Lecithin | 5.9 |
| N-Tallow 1,3 Propanedianine | 2.5 |
| Petroleum Distillate (SAE-10) | 4.2 |
| Amorphous Carbon (Calcined Petroleum Coke) | 336 Grams |

| 80 v/o $Si_3N_4$ - 20 v/o SiC (Insulator) LPEM Mix | |
|---|---|
| Silicon Metal | |
| 44 Micron | 670 grams |
| 10 Micron | 390 grams |
| Silicon Carbide (−325 mesh) | 416 grams |
| Organics | |
| Paraffin Waxes | 202.5 |
| Surfactants/Modifiers | |
| Ethylene Vinyl Acetate | 4.2 |
| Exxon Vistanex | 4.9 |
| Kantstick Z | 7.3 |
| Montan Wax | 5.4 |
| Steric Acid Diethanolanide | 5.0 |
| Oleric Acid | 5.9 |
| Steric Acid | 1.5 |
| Polymeric Fatty Ester | 4.1 |

A process for making a monolithic composite element in accordance with the present invention includes the step of providing a first mass of inorganic particles. These inorganic particles which may for example comprise a mix of silicon carbide and silicon nitride are utilized in a finely divided form. The preferred silicon carbide and silicon nitride materials have an average particle size of from about less than 0.10 to about 10 microns (greater than about 19 $m^2/gm$ to about 0.6 $m^2/gm$) with a maximum size of about 50 microns (0.1 $m^2/gm$).

The first mass of inorganic, preferably ceramic particles is then mixed with an organic thermoplastic molding compound such as a wax and up to about 5% by weight of a surfactant or surfactants to aid in wetting and dispersing the particles. The particle component may range from about 50% by volume to about 88% by volume with the higher percentages preferred in order to minimize shrinkage and deformation during the subsequent steps in the process.

The principle organic component of the thermoplastic compounds can be selected from a variety of materials such as waxes, acrylic resins, nylon, polyethylene glycol, ethylene-vinyl acetate, polybutylene, polypropylene and the like. However, in a preferred form, the thermoplastic compounds are selected from the waxes. Such waxes include virtually any wax such as paraffin, microcrystalline, carnauba, poly ethylene wax, synthetic hydrocarbon wax, etc.

Dispersing the ceramic particles into the thermoplastic involves wetting of the particles by the thermoplastic and displacement of air from the particle surfaces. In a preferred embodiment of the invention, either a paraffin wax, a mixture of paraffin wax and microcrystalline wax, or a mixture of paraffin wax, microcrystalline wax and Montan wax, compose the major portion of the binder phase.

Even though the inorganic particles have been wet by the thermoplastic they may still be aggregated into clumps or flocks which should be broken up in order to be well dispersed in the thermoplastic. Good dispersion is important if the green body structure and final product is to have a homogeneous microstructure and may be essential if it is desired to obtain the maximum concentration of particles in the mixture. Therefore it is desirable to use a mixer that produces a high degree of shearing action during the mixing to produce a stable dispersion with a high concentration of solids.

Once the particles have been dispersed into the thermoplastic, it may be necessary to prevent the individual particles from coming together to once again form aggregates. This may require the formation of interparticle forces. In non-polar organic media such as waxes stearic barriers are generally used to disperse solid particles. Such barriers are developed using certain surfactants such as long chain alcohols and fatty acids, which function as dispersing agents. These dispersing agents are absorbed at the binder-particle interface and stability arises because the absorbed molecules extend into the organic media and inhibit the close approach of two particles to each other.

In a preferred embodiment of the invention, the dispersing agents have a chemically functional group that is absorbed at the interface between the surface of the particles and the wax and have an organophillic polymeric chain that extends into the wax phase. The absorbed functional group couples to the particle via hydrogen bonding to form a weak chemical bond. In some cases they react with entities on the particle surfaces such as hydroxyl groups, forming irreversible bonds. These organophilic polymeric chains extend into the wax phase to create stearic barriers either from the energy required to dissolve the chains as the particle approach one another, or from the decrease in the entropy of the system as the polymeric chains are restricted in their movement by the approach of two particles.

In the practice of the invention, it may be advantageous to add various other functional compounds to the mixes such as lecithin or a micronized microcrystalline wax as a lubricant for ejection molding or extrusion mixes. The mix is then added to an ejection molding machine or extruder. As used herein, ejection molding has been used to define a process which is essentially similar to injection molding, but the thermal plastic particle mix is ejected or extruded onto a moving belt instead of into a mold. Thus, a shaped body ribbon or a tape like preform preferably with a generally rectangular cross section is produced. This ejection molding also takes place at a very low pressure as for example 25 to 50 psi. In the preferred embodiment of the invention, the mixed thermoplastic particle mix is low pressure injection or ejection molded to produce the shape layer or tape i.e., a green body preform with a high green density.

The thermoplastic particle mixture is sufficiently fluid when molten, that pressures of less than 150 psi are adequate to extrude the mixture through an appropriate die. In fact, high concentrated solid i.e. >50% solids can be extruded at 25 to 50 psi or even less. These low pressures can be obtained by air pressure applied to a molten mass of the mixture contained in a suitable pressure pot having a valve and nozzle for conveying the mix onto a moving belt or the like. The use of a conventional screw or piston delivery machines as used for the injection molding of plastics may also be used if the delivery pressure has been reduced to insure the low pressures which are required in accordance with a preferred embodiment of the invention.

The rheological behavior of such high solids (>65% by volume) mixes exhibits a strong dilatsency as pressures are increased. Viscosity increases disproportally as pressure is increased. If the pressures are increased above about 100–200 psi such mixes have been shown to become irreversibly solid, destroying any fluidity that might have been present at lower pressures.

A second mass of inorganic particles having a different composition than the first mass is then provided. This second mass of inorganic particles may also comprise a mix of silicon carbide and silicon nitride particles in a finely divided form. For example, the average particle size in the second mass may be approximately the same as the particles in the first mass. However, in the second mass of particles the amount of silicon carbide and silicon nitride particles are such that the final composition will have different electrical properties than the final composition of the first mass of inorganic particles.

The second mass of inorganic particles is then mixed with an organic thermoplastic molding compound in the same manner as the first mass of inorganic particles to form a second stable dispersion with a high concentration of solids. The thermoplastic in this mix may be the same as in the first mix. The second green body is then formed from the second stable dispersion.

In one embodiment of the invention, the green bodies are formed by low pressure ejection molding onto a moving belt and may be extruded simultaneously with one layer on top of and in intimate contact with the other. The two layers 4 and 6 are then heated while in intimate contact at a sufficient temperature as for example, 300–500° C. for a sufficient time, 30 to 60 minutes, to remove a major portion, if not all, of the thermoplastic material to thereby form a brown body. During this heating a portion of the finest particles migrates between the two bodies, effectively eliminating any structural discontinuities.

In one embodiment of the invention, the brown body i.e. the layers 4 and 6 which are in intimate contact with one another are densified. For example, the bodies are sintered by being heated to a temperature of at least 1000° C. for a sufficient time, i.e. at least about 30 minutes, to cause it to shrink and become more dense. During sintering, small particles which have higher energy than the larger ones are consumed by evaporation, condensation, by surface migration, etc and as a result the size of the grain increases as the body sinters.

To reach the highest possible densities, high temperatures, 1600°–2000° C. for silicon carbide and relatively long periods of time (1–3 hours) at those temperatures are required. During this time, especially in sintering silicon carbide, extensive grain growth occurs. Also with silicon carbide, the grains being formed tend to become highly anisotropic. The grains grow in one (needles) or two (plates) directions with only minimal growth in the third. These long grains tend to intersect and when they do, further densification (shrinkage) is prevented. This effect is referred to as exaggerated grain growth.

One consequence of exaggerated grain growth is that the properties of these grains generally differ with respect to the crystal orientation. Shrinkage along an elongated grain, being different from that of smaller surrounding grains, then results in the development of contraction stresses between the individual grains during cooling. Such stresses lead to lower overall strengths, even failure or cooling such sintered bodies. Therefore, it is desirable to have the smallest size and most equiaxed shapes in the final body. To this end, the bodies may be seeded with a quantity of offending type grains as will be well understood by those of ordinary skill in the art.

It is also contemplated that the igniters and like products in accordance with the present invention may be formed by subjecting the brown body to reaction bonding. When reaction bonding is used, a green body is prepared by mixing several phases. For example, silicon carbide and carbon can be formed into a green body. When such a body is heated in contact with certain reactive materials, such as silicon vapor, molten silicon, etc. the carbon is converted to silicon carbide. By converting the carbon to silicon carbide, a major densification can be achieved. In addition, other systems such as silicon and nitrogen, aluminum and nitrogen, aluminum and oxygen have been used in reaction bonding systems.

The reaction bonding of silicon carbide takes place at about 2000° C. and at these temperatures, the silicon carbide produced is of a cubic structure and is quite fine in crystalize size. The reaction bonded silicon carbide is therefore generally heated to some higher temperature to convert the cubic silicon carbide to the hexagonal ($\alpha$) form a process referred to as recrystalization, and to cause the grains to grow.

It is also customary to have a green structure below a certain density to allow the reaction bonding to go to completion. If the amount of carbon is too high, relative to the porosity of a body, the initial silicon carbide that forms will expand to seal all of the surface porosity, and an additional silicon atom cannot diffuse into and react with the interior carbon.

It is important to explain the process of reaction bonding, or reaction sintering as it is sometimes called. The starting composition for a reaction bonded material need not contain any of the final phase. A green silicon nitride reaction bonded body for example, need contain no silicon nitride, but consist of silicon metal alone, which on exposure to nitrogen at sufficient temperature will be converted to silicon nitride. Likewise, a green body composed of carbon only represents a precursor to reaction bonded silicon carbide.

Therefore, in referring to a silicon nitride or silicon carbide green body we include those compositions containing the precursor with or without a fraction of the product. Thus, a silicon nitride precursor composition will contain silicon metal to be converted with or without a fraction of silicon nitride. Similarly, a silicon carbine precursor will contain carbon, or a material which will provide a reactive carbon, with or without a fraction of silicon carbide.

In determining the theoretical density of a final reaction bonded body, it is necessary to take into account the changes in volumes as the precursors are converted to the product. A formula weight of carbon is 5.5 cc (12.01 g/molecular weight divided by the density of the form of carbon or graphite present, typically 1.7–2.2 g/cc). A formula weight of silicon carbide is 12.5 cc (40.1 g/formula weight divided by 3.2 g/cc density). Thus, 5.5 cc of carbon/graphite yields 12.5 cc of silicon carbide, an increase in volume of 7.0 cc/formula weight or 12.7% of the original carbon volume. Similarly, 3 formula weights of silicon metal, (28.06 grams per formula weight) or 84.2 grams of density of 2.3 corresponds to an initial volume of 36.7 cc. This reacts with nitrogen gas to yield one, formula weight of silicon nitride ($Si_3N_4$) having a formula weight of 140.3, a density of 3.4 g/cc, hence a molar (formula) volume of 41.3 cc/molar. This conversion will produce a change in volume of 4.6 cc/formula weight or 12.5% of the original silicon volume.

Since there is no, or negligible change in overall dimensions of a part during reaction bonding, the increase in volume is a result of the reaction displaces porosity in the green body, producing a more dense product.

Referring to green bodies containing both silicon carbide and silicon nitride, substitution on a volume basis can be made silicon carbide for silicon nitride and silicon nitride for silicon carbide. Substitution of silicon nitride into a silicon carbide green body, where the substitution is made for a portion of the carbon, volume substitution is made on the basis on the silicon carbide that will be formed, and similarly for substitution of silicon carbide for the silicon precursor in a reaction bonded silicon nitride body the volume of silicon carbide must be made based on the volume of silicon nitride that would be formed.

For some applications, it may be desirable to combine reaction bonding and sintering in order to obtain a very dense body. With this approach an additional material such as yttrium oxide (yttria) is added to the green body. This additional material is a sintering aid which is unreacted during the reaction bonding. In one embodiment of the invention, the yttria is added to one or both of the silicon carbide/silicon nitride mixes. Then after forming the green bodies and bringing them into intimate contact with one another, a brown body is formed by heating to a temperature of between about 300° to 500° C. in an inert atmosphere for a sufficient time (debinding) to remove the organic binder.

For reaction bonding it is necessary to include elemental silicon melted, silicon vapor, carbon or graphite. It is also necessary to heat the silicon carbide to a temperature of between 1600–2100° C. It should also be recognized that at the highest temperatures some silicon nitride may decompose and serve as another source of silicon.

It also contemplated that other applications might include an electrically insulating layer with silicon nitride or aluminum oxide an any electrically conducting layer of titanium nitride. An important factor in utilizing such materials resides in the use of low pressure ejection molding which facilitates the intimate bonding between segments during the debinding step.

In a further application, aluminum nitride and silicon nitride or beryllium nitride and silicon nitride may be employed in conjunction with a thermally insulating layer. In this case, the same pair of materials are employed but in the reverse order, i.e. of the volume percentages in each layer. In such cases, it may be desirable to spread the heat uniformly about the surface, while preventing the escape to some heat resistive support structure or neighboring electronic system.

Further embodiments of the invention may involve the use of aluminum metal which would be converted in situ to aluminum oxide, silicon metal converted to silicon nitride and titanium or zirconium metal which is then converted to a nitride. Still further embodiments of the invention include tungsten metal and titanium nitride wherein the hardness of a high titanium nitride surface is coupled with a dense tungsten rich mass.

In addition, an oxide system in which an oxide having a high emissivity, such as chromium oxide could be coupled with a lower emissivity "tough" oxide offers yet another possible option.

What is claimed is:

1. A ceramic ignitor for fluid fuels comprising a ceramic heating element and a high density ceramic insulating substrate consisting essentially of silicon nitride and about 20 to 40% by volume of silicon carbide with a density of between about 70% and 95% of theoretical density, and wherein said ceramic heating element is seamlessly bonded to said insulating substrate to thereby form a monolithic body, and a pair of electrical contacts with one of said pair attached to each of said cold ends so that current passing through said heating element elevates the temperature thereof to the ignition temperature of the fuel.

2. A ceramic ignitor for fluid fuels according to claim 1 in which the resistivity of said ceramic heating element is greater than 0.002 ohm centimeters.

3. A ceramic ignitor for fluid fuels according to claim 2 wherein said ceramic heating element has a temperature coefficient or resistivity of ($1 \times 10^{-6}$ to $3 \times 10^{-6}$) ohm cm/° C.

4. A ceramic ignitor for fluid fuels according to claim 1 wherein said ceramic heating element includes terminal attaching portions having a large cross sectional area and a heat generating intermediate portion having a reduced or relatively small cross sectional area which is located between the terminal attaching portions.

5. A ceramic ignitor for fluid fuels according to claim 4 wherein said ceramic heating element includes a sintering aid.

6. A ceramic ignitor for fluid fuels according to claim 5 wherein said substrate includes a sintering aid.

7. A ceramic ignitor for fluid fuels according to claim 5, wherein said sintering aid is selected from the group consisting of yttria, magnesia and alumina.

8. A ceramic ignitor for fluid fuels according to claim 1 wherein said ceramic heating element includes nitrogen doped silicon carbide.

9. A ceramic ignitor for fluid fuels according to claim 8 wherein said silicon carbide is doped to its saturation point.

10. A composite monolithic ceramic igniter comprising a polyphasic ceramic insulator and a polyphasic ceramic resistor contiguous with said insulator and bonded thereto with a joint free mechanically continuous structure and wherein said resistor has a relatively constant but slightly positive resistivity over a temperature range of from ambient temperature to about 1200° C., and means for passing an electric current through said resistor to thereby raise the temperature of the igniter.

11. A composite monolithic ceramic igniter in accordance with claim 10 wherein the resistivity of said resistor ranges from $1 \times 10^{-3}$ to about $3 \times 10^{-3}$ ohm cm at about 1200° C.

* * * * *